US009468329B2

(12) United States Patent
Lazza

(10) Patent No.: US 9,468,329 B2
(45) Date of Patent: Oct. 18, 2016

(54) TEA BREWING ASSEMBLY

(71) Applicant: N&W GLOBAL VENDING S.P.A., Valbrembo (IT)

(72) Inventor: Daniele Lazza, Milan (IT)

(73) Assignee: N&W GLOBAL VENDING S.P.A., Valbrembo (IT)

( * ) Notice: Subject to any disclaimer, the term of this patent is extended or adjusted under 35 U.S.C. 154(b) by 192 days.

(21) Appl. No.: 14/361,175

(22) PCT Filed: Dec. 3, 2012

(86) PCT No.: PCT/IB2012/056908
§ 371 (c)(1),
(2) Date: May 28, 2014

(87) PCT Pub. No.: WO2013/080186
PCT Pub. Date: Jun. 6, 2013

(65) Prior Publication Data
US 2014/0331866 A1 Nov. 13, 2014

(30) Foreign Application Priority Data
Dec. 1, 2011 (IT) .............................. TO2011A1103

(51) Int. Cl.
*A47J 31/20* (2006.01)
*A47J 31/40* (2006.01)
*A47J 31/06* (2006.01)

(52) U.S. Cl.
CPC ............. *A47J 31/40* (2013.01); *A47J 31/0615* (2013.01); *A47J 31/405* (2013.01)

(58) Field of Classification Search
CPC ..... A47J 31/0615; A47J 31/40; A47J 31/405
USPC ................... 99/279, 280, 289 R, 297, 323.3; 426/433
See application file for complete search history.

(56) References Cited

U.S. PATENT DOCUMENTS

| 4,885,986 | A | * | 12/1989 | Grossi | ................. | A47J 31/3619 99/289 R |
| 5,823,096 | A | | 10/1998 | Shih | | |
| 7,673,555 | B2 | * | 3/2010 | Nosler | ................. | A47J 31/007 426/433 |
| 2009/0317526 | A1 | * | 12/2009 | Tacklind | ............. | A47J 31/0615 426/433 |

FOREIGN PATENT DOCUMENTS

DE 3821994 1/1990
WO WO 2008/026918 3/2008

OTHER PUBLICATIONS

International Search Report and Written Opinion from International Application No. PCT/IB2012/056908 mailed Jun. 6, 2013.

* cited by examiner

Primary Examiner — Dana Ross
Assistant Examiner — Lindsey C Teaters
(74) Attorney, Agent, or Firm — Dorsey & Whitney LLP

(57) ABSTRACT

A tea brewing assembly having a brewing chamber with a top opening for loading/unloading a measure of tea, and a bottom wall; an ejector piston having a head permeable to liquid and mounted inside the brewing chamber to move between a lowered brewing position, and a raised position ejecting the measure of tea from the brewing chamber; a doctor for removing the measure of tea from the head in the raised position; a brewed beverage outlet communicating with the brewing chamber through an outlet opening formed through the bottom wall; a plug for controlling the outlet; and one actuator assembly for controlling the ejector piston, the doctor, and the plug.

8 Claims, 7 Drawing Sheets

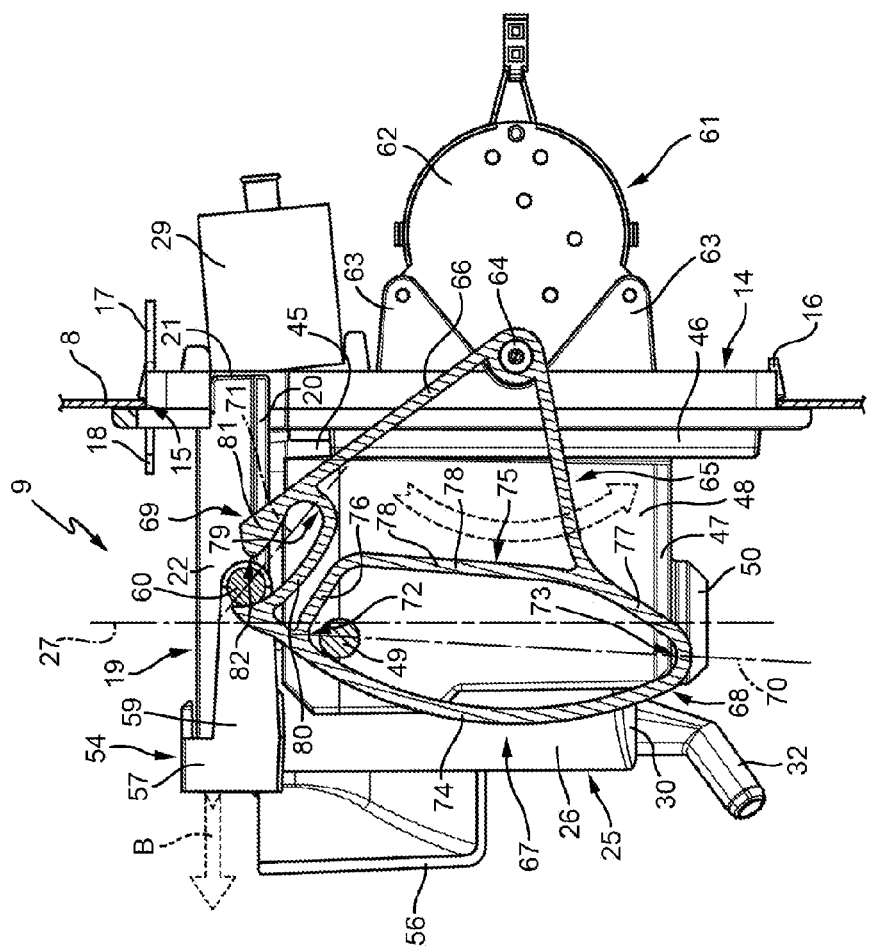
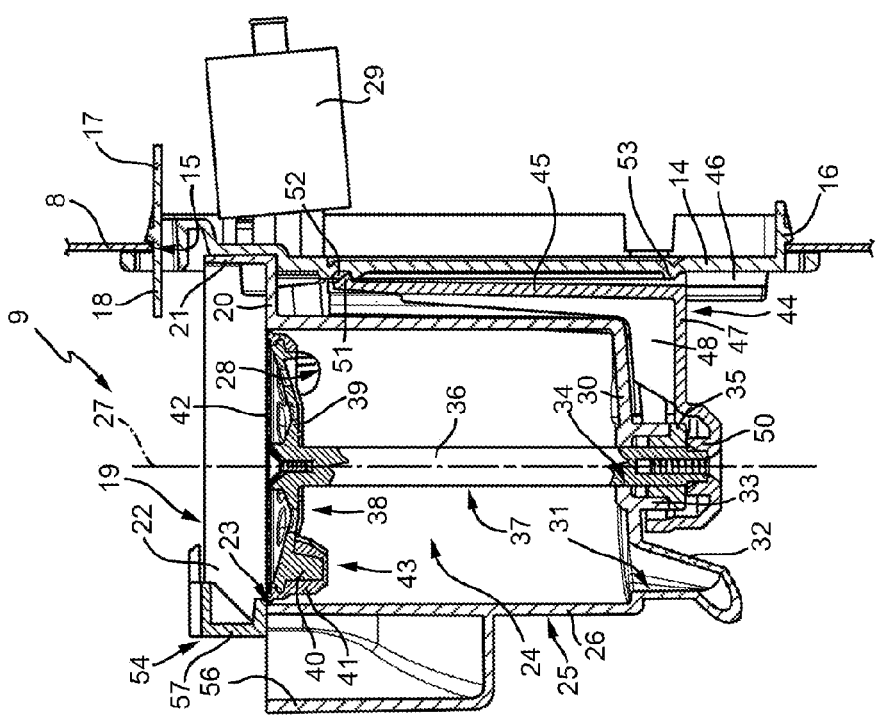
FIG. 4
FIG. 3

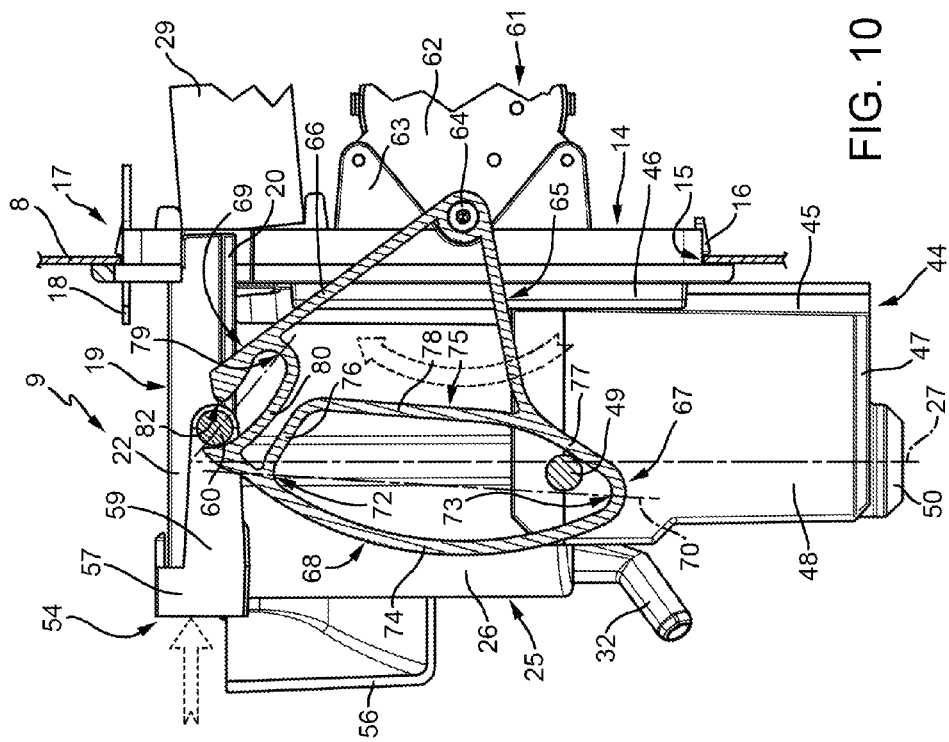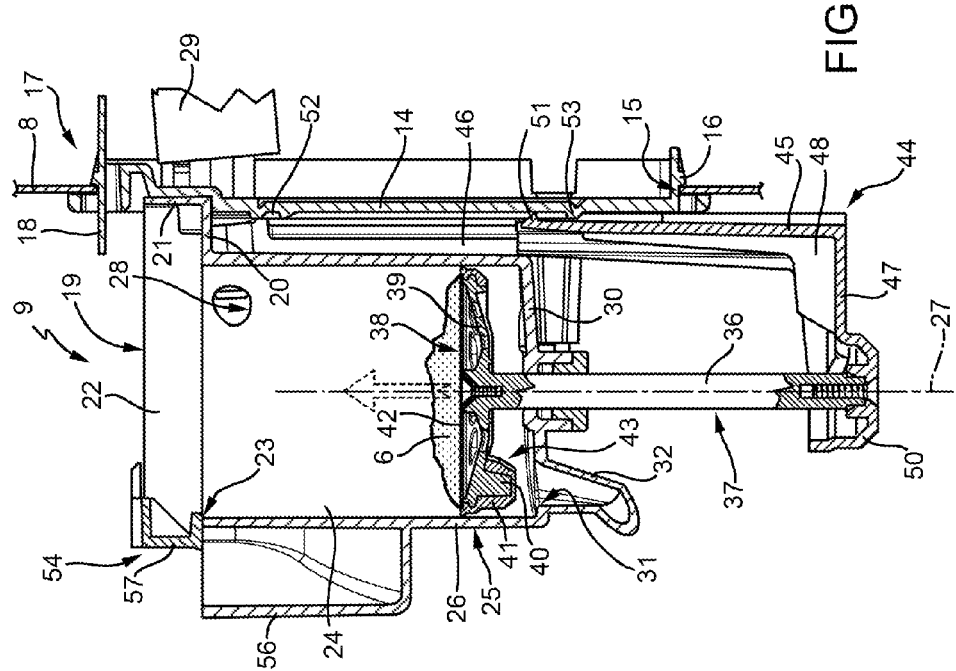

TEA BREWING ASSEMBLY

TECHNICAL FIELD

The present invention relates to a tea brewing assembly.

BACKGROUND ART

More specifically, the present invention relates to a tea brewing assembly of the type comprising a brewing chamber with a top opening for loading/unloading a measure of tea, and a bottom wall; an ejector piston comprising a head permeable to liquid and mounted inside the brewing chamber to move between a lowered brewing position, and a raised ejection position to expel the measure of tea from the brewing chamber; a doctor for removing the measure of tea from the head in the raised position; a brewed beverage outlet; and plugging means controlling the outlet.

DISCLOSURE OF INVENTION

It is an object of the present invention to provide a tea brewing assembly of the above type, which is of simple, low-cost design, and at the same time provides for controlling brewing of the tea inside the brewing chamber cheaply and easily.

According to the present invention, there is provided a tea brewing assembly as claimed in claim 1 and preferably in any one of the Claims depending directly or indirectly on claim 1.

BRIEF DESCRIPTION OF THE DRAWINGS

A non-limiting embodiment of the present invention will be described by way of example with reference to the accompanying drawings, in which:

FIGS. 3 and 4 show a partly sectioned axial section and partly sectioned side view respectively of the FIG. 2 tea brewing assembly;

FIGS. 9 and 10 show a partly sectioned axial section and partly sectioned side view respectively of the FIG. 2 tea brewing assembly in a further successive operating configuration;

BEST MODE FOR CARRYING OUT THE INVENTION

Figure 1:
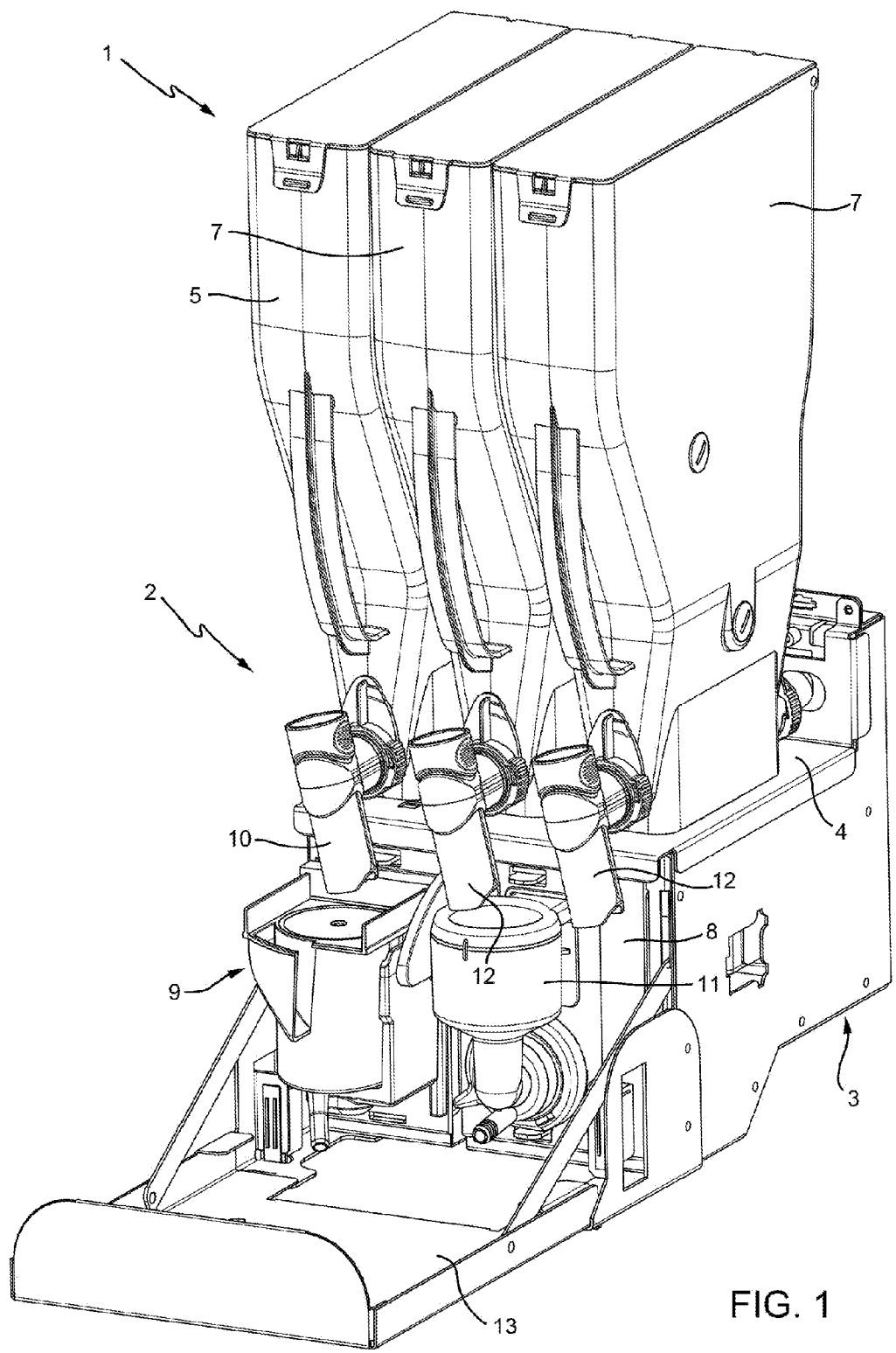
FIG. 1 shows a view in perspective of a beverage vending machine brewing unit comprising a preferred embodiment of the tea brewing assembly according to the present invention.

Number 1 in FIG. 1 indicates as a whole a beverage vending machine, which houses a dispensing unit 2 with a box support 3, a horizontal top wall 4 of which supports a number of containers: one, indicated 5, for tea 6 (FIG. 5), and the others, indicated 7, for respective soluble powdered substances. Box support 3 also comprises a vertical front wall 8, to which a tea brewing assembly 9 is fitted beneath an outlet 10 of container 5, and to which at least one mixer assembly 11 is fitted beneath outlets 12 of containers 7. Brewing assembly 9 and mixer assemblies 11 are protected at the front by a drop-down hatch 13 movable between a horizontal open position (FIG. 1) and a vertical closed position (not shown) parallel to front wall 8.

Figure 2:
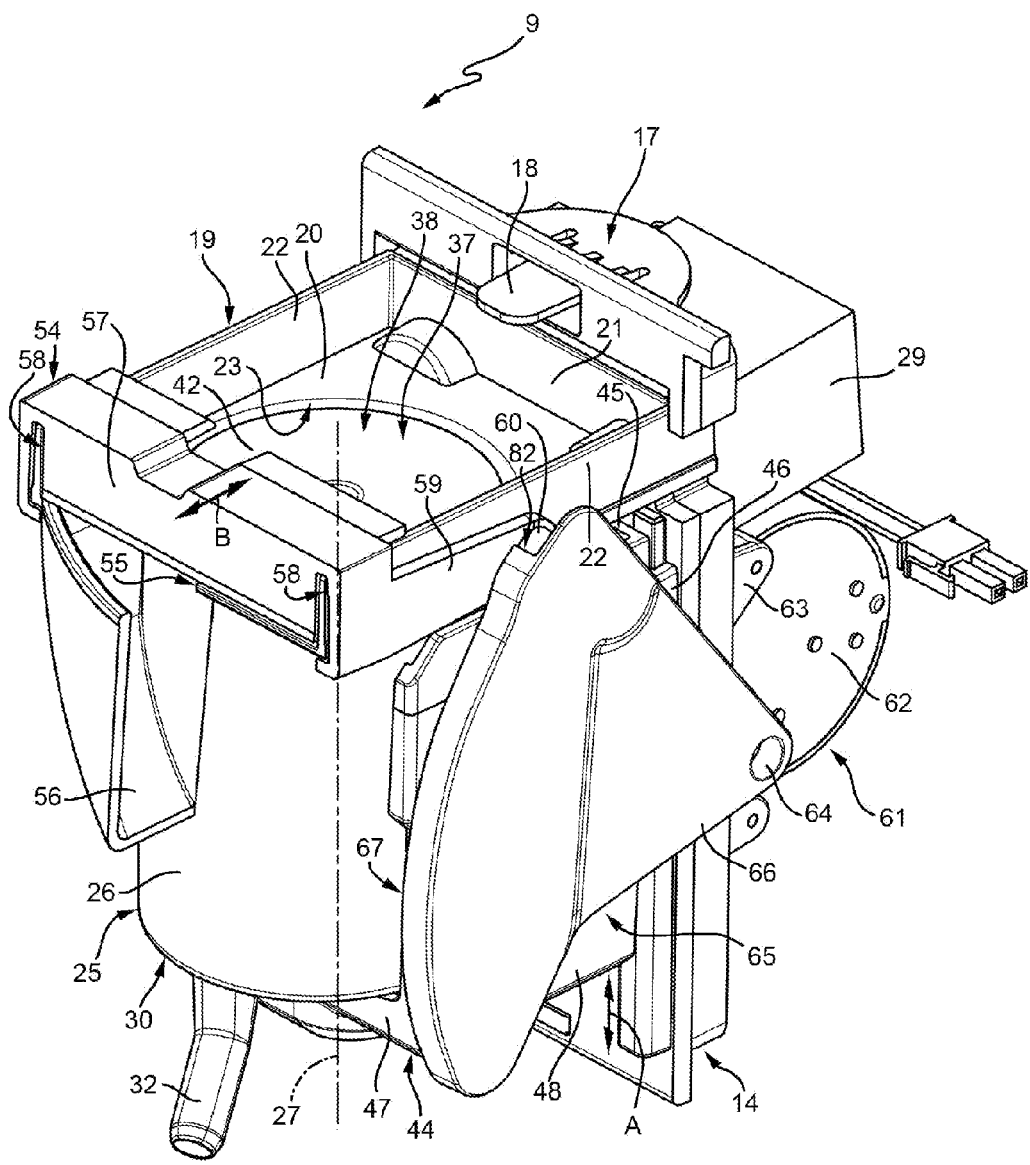
FIG. 2 shows a larger-scale view in perspective of the FIG. 1 tea brewing assembly in a first operating configuration.

As shown more clearly in FIGS. 2 and 3, brewing assembly 9 comprises a rear frame 14 defined by a vertical plate positioned contacting the outer surface of front wall 8 of box support 3 at an opening 15 through front wall 8. Frame 14 is connected to front wall 8 at the bottom by a catch 16, which extends from frame 14 towards front wall 8, penetrates opening 15, and cooperates with a bottom edge of opening 15. Frame 14 is connected to front wall 8 at the top by a flexible rocker arm 17, which is hinged by a virtual hinge to the top end of frame 14, penetrates opening 15, has a tooth which clicks onto the top edge of opening 15, and has an arm 18, which projects frontwards of frame 14 and is operated manually for fast release of frame 14, and therefore of brewing assembly 9, from front wall 8.

At the top end, frame 14 is fitted with a horizontal U-shaped frame 19, which is perpendicular to frame 14, extends frontwards from the surface of frame 14 opposite the surface connected to front wall 8, and is closed at the bottom by a bottom wall 20. More specifically, frame 19 comprises a rear wall 21 extending upwards from bottom wall 20 and integral with frame 14; and two parallel arms 22 perpendicular to rear wall 21 and to bottom wall 20, and extending frontwards from rear wall 21.

Bottom wall 20 has a circular access opening 23 to a brewing chamber 24 defined by a cylindrical cup-shaped body 25 comprising a cylindrical tubular lateral wall 26, which has a vertical axis 27 and is connected integrally to the underside surface of bottom wall 20. Lateral wall 26 has an inside diameter equal to the diameter of circular opening 23, and, close to bottom wall 20 of frame 19, has a tangential inlet hole 28 connected through frame 14 and opening 15 to a hot-water inlet fitting 29. Lateral wall 26 is closed at the bottom by a bottom wall 30 having a lateral opening 31 communicating with a tea beverage spout 32.

A tubular appendix 33, coaxial with axis 27, projects downwards from the underside surface of bottom wall 30, communicates with brewing chamber 24 through a hole 34 through bottom wall 30, and houses a tubular seal 35 engaged in sliding and fluidtight manner by a cylindrical rod 36 of a piston 37, which, in addition to rod 36, comprises a circular head 38 housed inside brewing chamber 24 and movable, along brewing chamber 24 and in a vertical direction A parallel to axis 27, between a lowered position contacting bottom wall 30, and a raised position flush with the topside surface of bottom wall 20 of frame 19.

As shown more clearly in FIG. 3, head 38 comprises a perforated cup-shaped plate 39, which is made of plastic material, has a bottom appendix 40, is covered underneath with a perforated elastic sheath 41, and is closed at the top by a filter 42. Appendix 40 and the relative portion of elastic sheath 41 define a plug 43 positioned to seal opening 31 in fluidtight manner when head 38 is in the lowered position.

As shown in FIG. 3, piston 37 is moved axially between the lowered and raised position of head 38 by a pusher 44, which is substantially L-shaped in longitudinal section and comprises a vertical arm defined by a slide 45 interposed between cup-shaped body 25 and frame 14, parallel to and facing frame 14, and mounted to slide on two vertical guides 46 on frame 14. Pusher 44 also comprises a substantially horizontal arm 47 extending beneath cup-shaped body 25 from the bottom end of slide 45; and a rectangular lateral stiffening plate 48, which is located outside and alongside cup-shaped body 25, and is parallel to axis 27 and perpendicular to slide 45 and arm 47. Lateral plate 48 is connected integrally to arm 47 and slide 45, and is fitted close to its top end with a control roller or pin 49, which extends, perpendicular to axis 27, from the surface of lateral plate 48 opposite the surface facing cup-shaped body 25.

On its free end, arm 47 has a plate 50 coaxial with axis 27 and connected by a screw to the bottom end of rod 36 projecting beneath bottom wall 30 of cup-shaped body 25.

Figure 5:
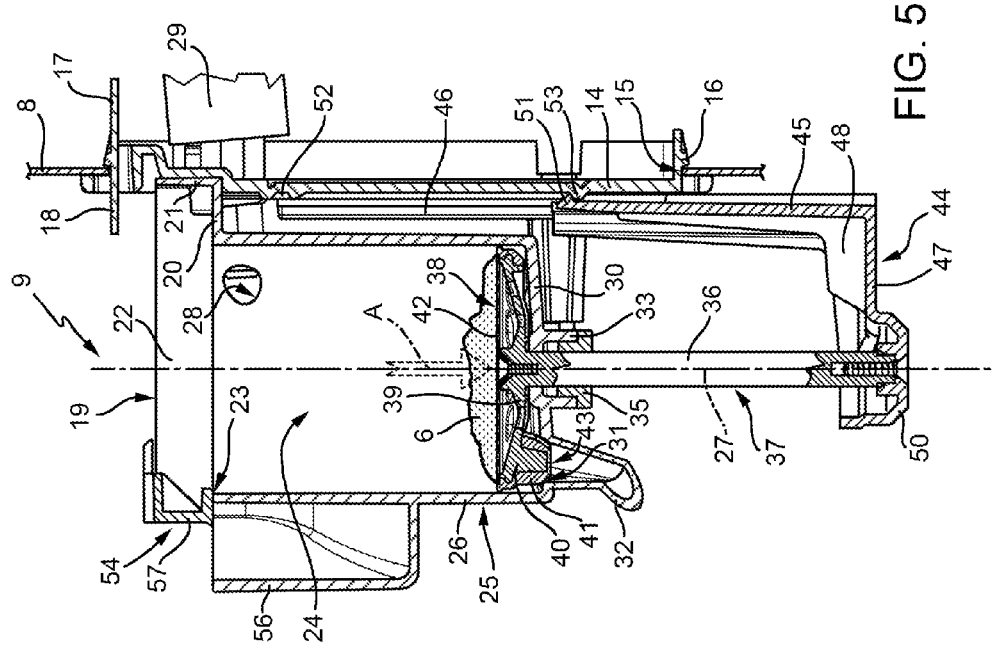
Figure 8:
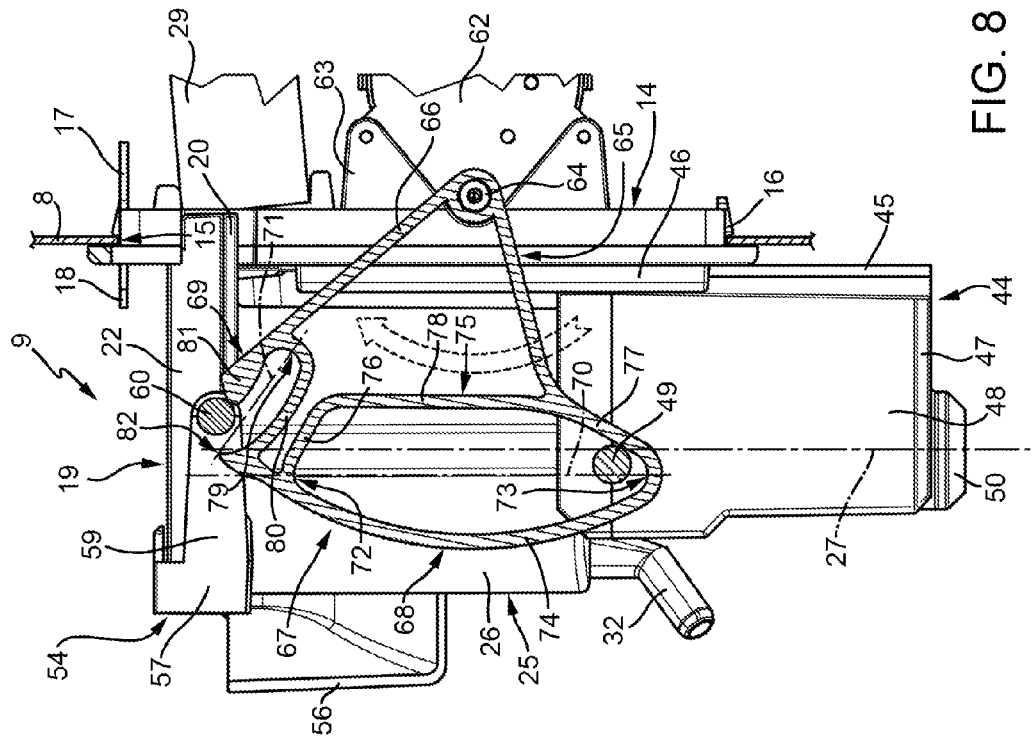
FIGS. 7 and 8 show a partly sectioned axial section and partly sectioned side view respectively of the FIG. 2 tea brewing assembly in a further successive operating configuration.
Figure 7:
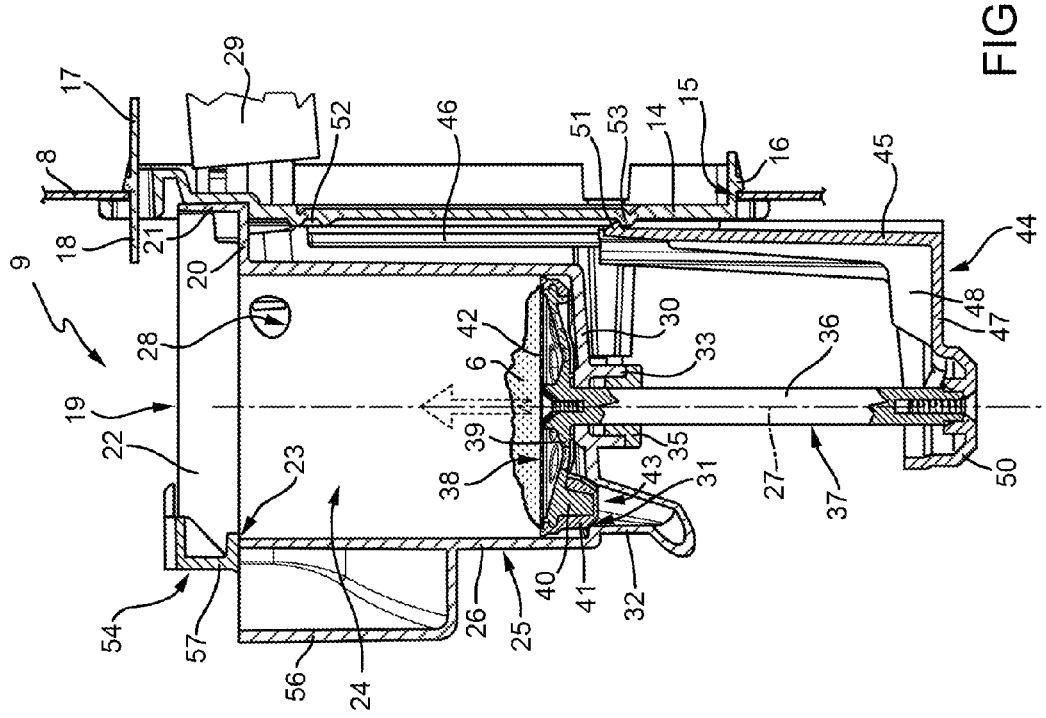
Figure 12:
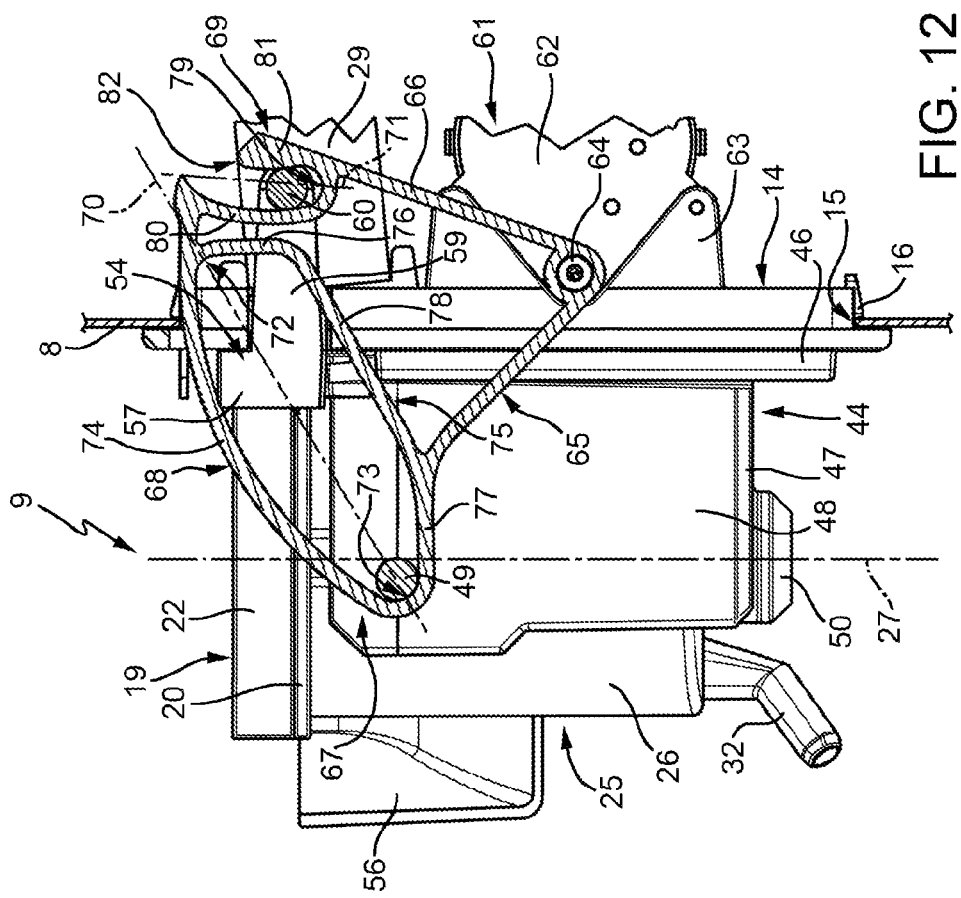
FIGS. 11 and 12 show a partly sectioned axial section and partly sectioned side view respectively of the FIG. 2 tea brewing assembly in a further successive operating configuration.
Figure 11:
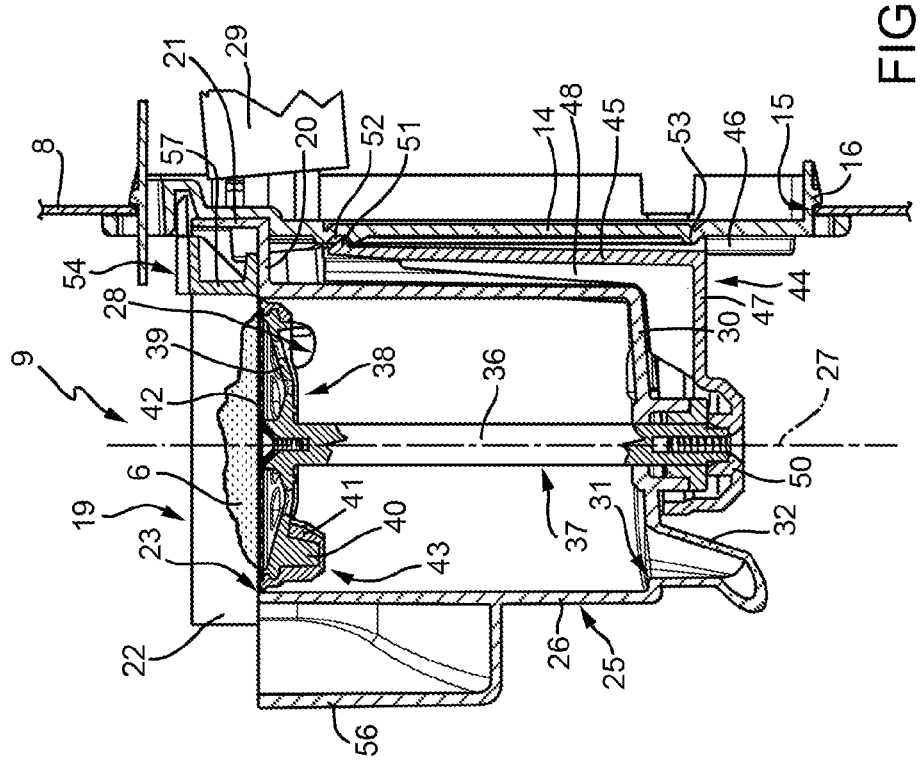

The top end of slide 45 has a tooth 51 facing frame 14, and which clicks inside a groove 52 on frame 14 when head 38 is in the raised position (FIG. 3), and rests on a rib 53 on frame 14 when head 38 is in the lowered position (FIGS. 5 and 7).

As shown more clearly in FIG. 2, frame 19, and more specifically arms 22, form a slideway, along which a doctor 54 slides, in a horizontal direction B perpendicular to direction A, between a withdrawn position (FIG. 1) contacting rear wall 21, and an extracted position (FIG. 2), in which doctor 54 is located past opening 23 and over a recess 55, which is formed along the edge of bottom wall 20 opposite the edge facing rear wall 21, and defines an access to an unloading chute 56 located outside cup-shaped body 25 and on the opposite side of cup-shaped body 25 to frame 14.

Doctor 54 comprises a crosspiece 57 with two slots 58 parallel to each other and to direction B and each engaged in sliding manner by a respective arm 22; a lateral appendix 59 extending in direction B from the end of crosspiece 57 located outside frame 19 and over lateral wall 48 of pusher 44; and an outer control roller or pin 60 fitted to appendix 59, and parallel to and located over control pin 49.

As shown more clearly in FIGS. 2 and 4, brewing assembly 9 has one actuator assembly 61 for moving both pusher 44 and doctor 54 back and forth in respective directions A and B with different laws of motion.

Actuator assembly 61 comprises a reversible motor reducer 62—in the example shown, a reversible electric motor—which is supported by two brackets 63 projecting through opening 15 from frame 14, and has an output shaft 64 parallel to and facing the same way as control pins 49 and 60. Actuator assembly 61 also comprises a hollow transmission member 65, which is fitted to shaft 64, is located outwards of, and with its concavity facing, lateral plate 48, and has, on the side facing lateral plate 48, a number of inner ribs defining one crank 66 and a cam 67 with two lobes 68 and 69.

Lobe 68 is a closed lobe defining a slot or link, which is engaged by a follower defined by control pin 49, has a longitudinal axis 70 roughly tangential to the travelling direction of lobe 68 about the axis of shaft 64, and converts oscillation of crank 66 into a straight reciprocating movement of control pin 49, and therefore of pusher 44, in direction A defined by guides 46 on frame 14.

Lobe 69, on the other hand, is an open or 'escapement' lobe defining a recess or link, which is engaged by a follower defined by control pin 60, has a longitudinal axis 71 roughly radial with respect to the axis of shaft 64, and converts part of the oscillation of crank 66 into a straight reciprocating movement of control pin 60, and therefore of doctor 54, in direction B defined by arms 22 of frame 19.

With reference to FIG. 4, lobe 68 has a top cusp 72 close to lobe 69, and a bottom cusp 73, both of which are sized to accommodate control pin 49, and are connected by a radially outer rib 74 and a radially inner rib 75 with respect to the axis of shaft 64. Rib 74 is substantially in the form of a roughly 60° arc of a circle centred about the axis of shaft 64. And rib 75 curves the opposite way to rib 74, and is substantially defined by a broken line comprising a sloping portion 76 adjacent to top cusp 72 and substantially crosswise to longitudinal axis 70; a sloping portion 77 adjacent to bottom cusp 73 and sloping the opposite way to portion 76 with respect to longitudinal axis 70; and an intermediate portion 78 connecting portions 76 and 77.

Lobe 69 has an inner cusp 79 located at a radially inner end of lobe 69 with respect to the axis of shaft 64, and sized to accommodate control pin 60; and two curved, substantially parallel lateral walls 80, 81, whose radially outer free ends with respect to the axis of shaft 64 define an opening 82, which communicates with the outside, is sized to permit passage of control pin 60, and is substantially crosswise to longitudinal axis 70.

Operation of brewing assembly 9 will now be described as of a rest or standby position shown in FIGS. 2, 3, 4, and in which doctor 54 is in the extracted position; control pin 60 engages opening 82 of lobe 69; pusher 44 is in the raised position, with tooth 51 engaging groove 52, and with piston 37 and filter 42 flush with the topside surface of bottom wall 20 of frame 19; and control pin 49 is located close to top cusp 72.

Figure 6:
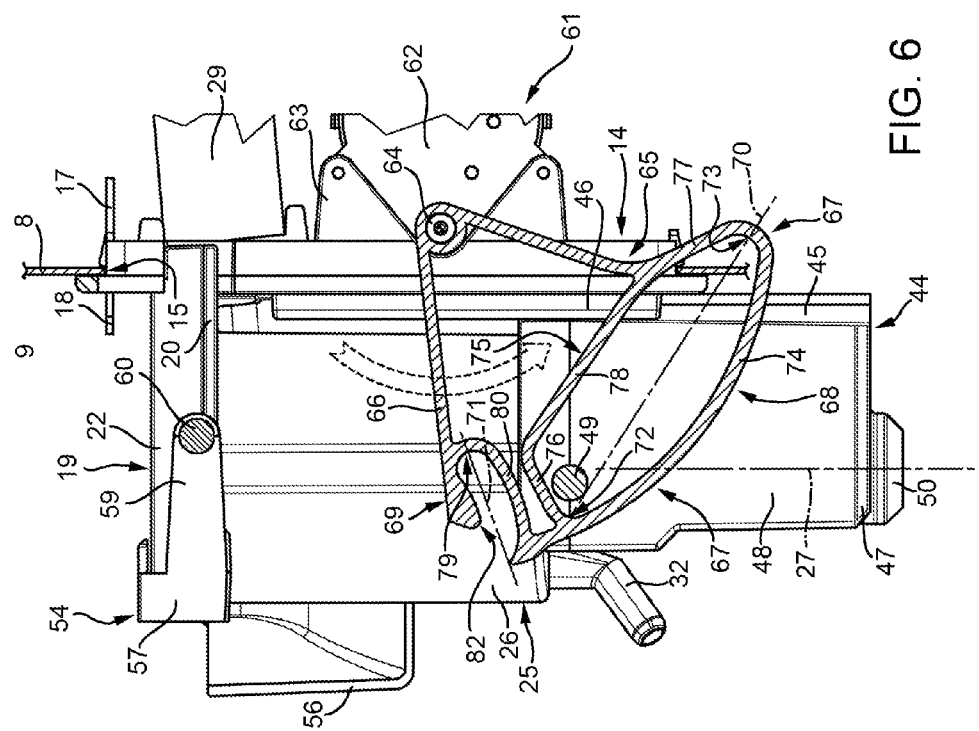
FIGS. 5 and 6 show a partly sectioned axial section and partly sectioned side view respectively of the FIG. 2 tea brewing assembly in a further successive operating configuration.

Upon user demand for a tea beverage, normally entered on a keypad (not shown) of an electronic central control unit (not shown), the electronic central control unit activates motor reducer 62 to rotate shaft 64 anticlockwise in FIGS. 4 and 6. As a result, control pin 60 is released from lobe 69 through opening 82; lobe 68 rests on control pin 49, first at cusp 72 and then along sloping portion 76; doctor 54 disengages from actuator assembly 61 and remains fixed in the extracted position; and pusher 44 is moved downwards into the lowered position (FIG. 5) in which tooth 51 rests on rib 53, head 38 is positioned contacting bottom wall 30, and plug 43 engages lateral opening 31 of brewing chamber 24 in fluidtight manner.

At this point, a measure of tea 6 is loaded onto filter 42 from outlet 10 of container 5, and a predetermined amount of hot water is fed through hole 28 into brewing chamber 24; and the electronic central control unit then deactivates motor reducer 62 for a given brewing time, during which lateral opening 31 remains sealed by plug 43.

When the brewing time expires and a tea beverage is formed inside brewing chamber 24, the electronic central control unit activates motor reducer 62 to rotate shaft 64 clockwise in FIGS. 9 to 12. As a result of a first stage in this rotation (FIG. 10), control pin 49 moves along sloping portion 77 of rib 75 of lobe 68, thus gradually detaching head 38 of piston 37 from bottom wall 30 (FIG. 9); and opening 82 of lobe 69 moves gradually towards control pin 60.

At the end of this first stage in the clockwise rotation of shaft 64 (FIG. 9), doctor 54, formerly disengaged from actuator assembly 61 and left free in the extracted position, is once more engaged by actuator assembly 61; and plug 43 is extracted completely from opening 31, allowing the beverage in brewing chamber 24 to flow out along spout 32. In this connection, it should be pointed out that outflow of the beverage is in no way impeded by head 38, whose filter 42, plate 39 and elastic sheath 41 are perforated.

As shaft 64 rotates further clockwise, control pin 60 engages lobe 69 and moves with it to move doctor 54 into the withdrawn position substantially contacting frame 14; and control pin 49 slides along sloping portion 77 of lobe 68 to engage bottom cusp 73, and then moves upwards with lobe 68 to move head 38 into the raised position (FIG. 11) flush with the topside surface of bottom wall 20 of frame 19, and with the dregs of the measure of tea located along the path of doctor 54.

In connection with the above, it should be pointed out that, as shaft 64 rotates further clockwise as described, movement of transmission member 65 transmits motion directly to control pin 60 and, therefore, to doctor 54, which therefore moves rapidly into the withdrawn position. As regards pusher 44, on the other hand, motion is only transmitted directly when control pin 49 engages bottom cusp 73 of lobe 68, and not as control pin 49 slides along sloping portion 77. In other words, sloping portion 77 acts as a delay member, to only allow head 38 to reach the raised position after doctor 54 has cleared circular access opening 23 to brewing chamber 24.

At this point, the central control unit (not shown) again reverses motor reducer 62 to restore brewing assembly 9 to the FIG. 3 standby position, so that control pin 49 moves freely along lobe 68, head 38 remains in the raised position, and doctor 54 moves into the extracted position, thus removing the dregs of measure of tea 6 off head 38, into recess 55, and onto chute 56.

The invention claimed is:

1. A tea brewing assembly, the tea brewing assembly comprising:
   a brewing chamber having a top opening for loading/unloading a measure of tea, and a bottom wall;
   an ejector piston including a head permeable to liquid and mounted inside the brewing chamber to move between a lowered brewing position and a raised position ejecting the measure of tea from the brewing chamber;
   a doctor for removing the measure of tea from the head in the raised position;
   a brewed beverage outlet that communicates with the brewing chamber through an outlet opening formed through the bottom wall; and
   plugging means for controlling the brewed beverage outlet, the plugging means include a plug fitted to the head, positioned facing the bottom wall, and designed and located to engage the brewed beverage outlet opening in a fluidtight manner when the head is in the lowered brewing position; and
   one actuator assembly provided to control the ejector piston, the doctor, and the plugging means.

2. The tea brewing assembly as claimed in claim 1, wherein the head includes a perforated plate having, on the side facing the bottom wall, an appendix facing the bottom wall; and a perforated elastic sheath and a filter on opposite sides of the perforated plate, the elastic sheath covering the appendix to form the plug.

3. The tea brewing assembly as claimed in claim 1, wherein the ejector piston and the doctor are fitted integrally with a first and second control member, respectively; and the actuator assembly includes reversible motor means having an output shaft substantially parallel to the control members; and a transmission member fitted to the output shaft and comprising a crank and a cam with two lobes each of which is engaged by a respective the control member.

4. The tea brewing assembly as claimed in claim 2, wherein the control members are pins substantially parallel to the output shaft.

5. The tea brewing assembly as claimed in claim 2, wherein a first of the two lobes is a closed lobe defining a slot or link, which is engaged by a follower defined by the first control member, and converts oscillation of the crank into a straight reciprocating movement of the first control member, and therefore of the ejector piston, in a first direction.

6. The tea brewing assembly as claimed in claim 5, wherein the first direction is substantially vertical.

7. The tea brewing assembly as claimed in claim 2, wherein a second of the two lobes is an open or escapement lobe defining a recess or link, which is engaged by a follower defined by the second control member, and converts part of the oscillation of the crank into a straight reciprocating movement of the second control member, and therefore of the doctor, in a second direction substantially crosswise to the first direction.

8. A tea brewing assembly, the tea brewing assembly comprising:
   a brewing chamber having a top opening for loading/unloading a measure of tea, and a bottom wall;
   an ejector piston including a head permeable to liquid, the ejector piston mounted inside the brewing chamber and configured to move between a lowered brewing position and a raised position in which the measure of tea from the brewing chamber is ejected;
   a doctor configured to remove the measure of tea from the head in the raised position;
   a brewed beverage outlet in communication with the brewing chamber through an outlet opening formed through the bottom wall of the brewing chamber; and
   a plug configured to control the brewed beverage outlet, the plug fitted to the head, positioned facing the bottom wall, and designed and located to engage the brewed beverage outlet opening in a fluidtight manner when the head is in the lowered brewing position; and
   an actuator assembly configured to control the ejector piston, the doctor, and the plug.

* * * * *